United States Patent
Baird et al.

(10) Patent No.: US 12,263,707 B2
(45) Date of Patent: Apr. 1, 2025

(54) MANUALLY PROPELLED FLOATING AQUATIC WHEELCHAIR

(71) Applicant: Steven Baird, Fort Collins, CO (US)

(72) Inventors: Steven Baird, Fort Collins, CO (US); Michael Bowers, Centennial, CO (US); Tara Mensch, Loveland, CO (US); Brandon Cook, Fort Collins, CO (US); Halley Havlicek, Spring Grove, IL (US)

( * ) Notice: Subject to any disclaimer, the term of this patent is extended or adjusted under 35 U.S.C. 154(b) by 522 days.

(21) Appl. No.: 17/727,655

(22) Filed: Apr. 22, 2022

(65) Prior Publication Data

US 2022/0339982 A1 Oct. 27, 2022

Related U.S. Application Data

(60) Provisional application No. 63/178,512, filed on Apr. 22, 2021.

(51) Int. Cl.
| | | |
|---|---|---|
| *B60F 3/00* | (2006.01) | |
| *A61G 5/02* | (2006.01) | |
| *B63H 1/14* | (2006.01) | |
| *B63H 16/20* | (2006.01) | |

(52) U.S. Cl.
CPC ............ *B60F 3/0069* (2013.01); *A61G 5/022* (2013.01); *B60F 3/0007* (2013.01); *B60F 3/0038* (2013.01); *B63H 1/14* (2013.01); *B63H 16/20* (2013.01)

(58) Field of Classification Search
CPC ........ B60F 3/00; B60F 3/0069; B60F 3/0007; B60F 3/0038; A61G 5/00; A61G 5/022; B63H 1/00; B63H 1/14; B63H 16/00; B63H 16/20; B63H 16/18; B63H 23/00; B63H 23/02; B63H 23/04
USPC ...................................... 440/12.55
See application file for complete search history.

(56) References Cited

U.S. PATENT DOCUMENTS

| | | |
|---|---|---|
| 4,705,284 A | 11/1987 | Stout |
| 4,926,777 A | 5/1990 | Davis, Jr. |
| 5,294,141 A | 3/1994 | Mentessi et al. |
| 5,634,650 A | 6/1997 | Hensler, Sr. et al. |
| 5,685,030 A | 11/1997 | Baranowski |
| 6,869,084 B2 | 3/2005 | Volk et al. |
| 7,504,025 B2 | 3/2009 | Burgassi |
| 8,430,189 B2 | 4/2013 | Tallino |
| 8,844,959 B2 | 9/2014 | Winter et al. |

(Continued)

FOREIGN PATENT DOCUMENTS

| | | |
|---|---|---|
| JP | H077625 U | 2/1995 |
| JP | 4003078 B2 | 11/2007 |

(Continued)

OTHER PUBLICATIONS

U.S. Appl. No. 12/557,902, filed May 20, 2010, Gschwind.
U.S. Appl. No. 14/390,300, filed Jul. 2, 2015, Müller.

*Primary Examiner* — Lars A Olson

(57) ABSTRACT

A human-powered wheelchair for use on land and in water that comprises flotation and propulsion means. The wheelchair can be propelled by the operator on land in a manner similar to a typical wheelchair. The wheelchair can be propelled in the water by propellers that are mechanically and rotationally coupled to the side wheels of the wheelchair.

14 Claims, 15 Drawing Sheets

(56) References Cited

U.S. PATENT DOCUMENTS 10,052,247 B2    8/2018  Vereen, III et al.
10,766,587 B2 *  9/2020  Chen ................... B60F 3/0007

FOREIGN PATENT DOCUMENTS

JP    2012019821 A    5/2014
WO    2013068710 A1   5/2013

* cited by examiner

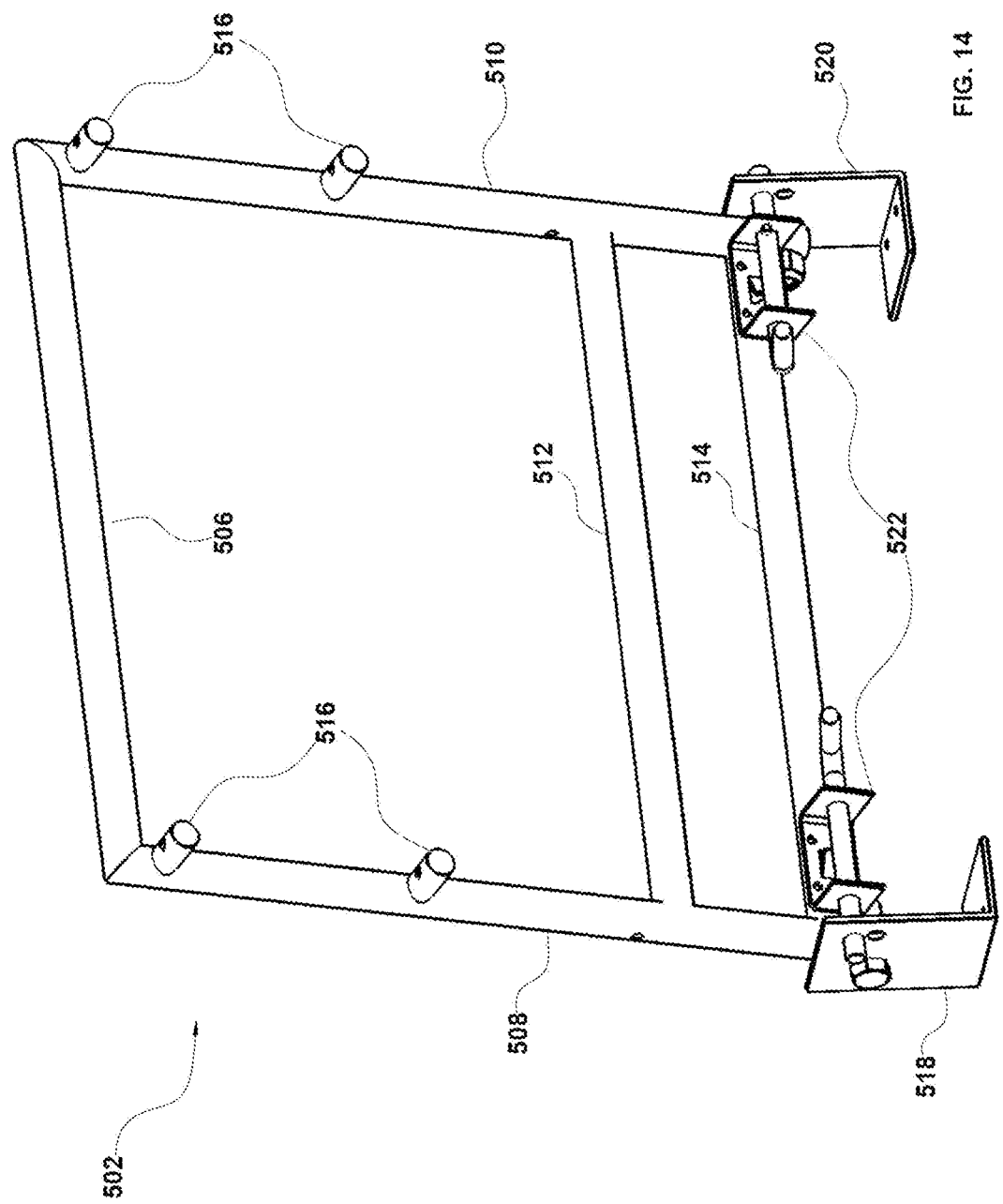

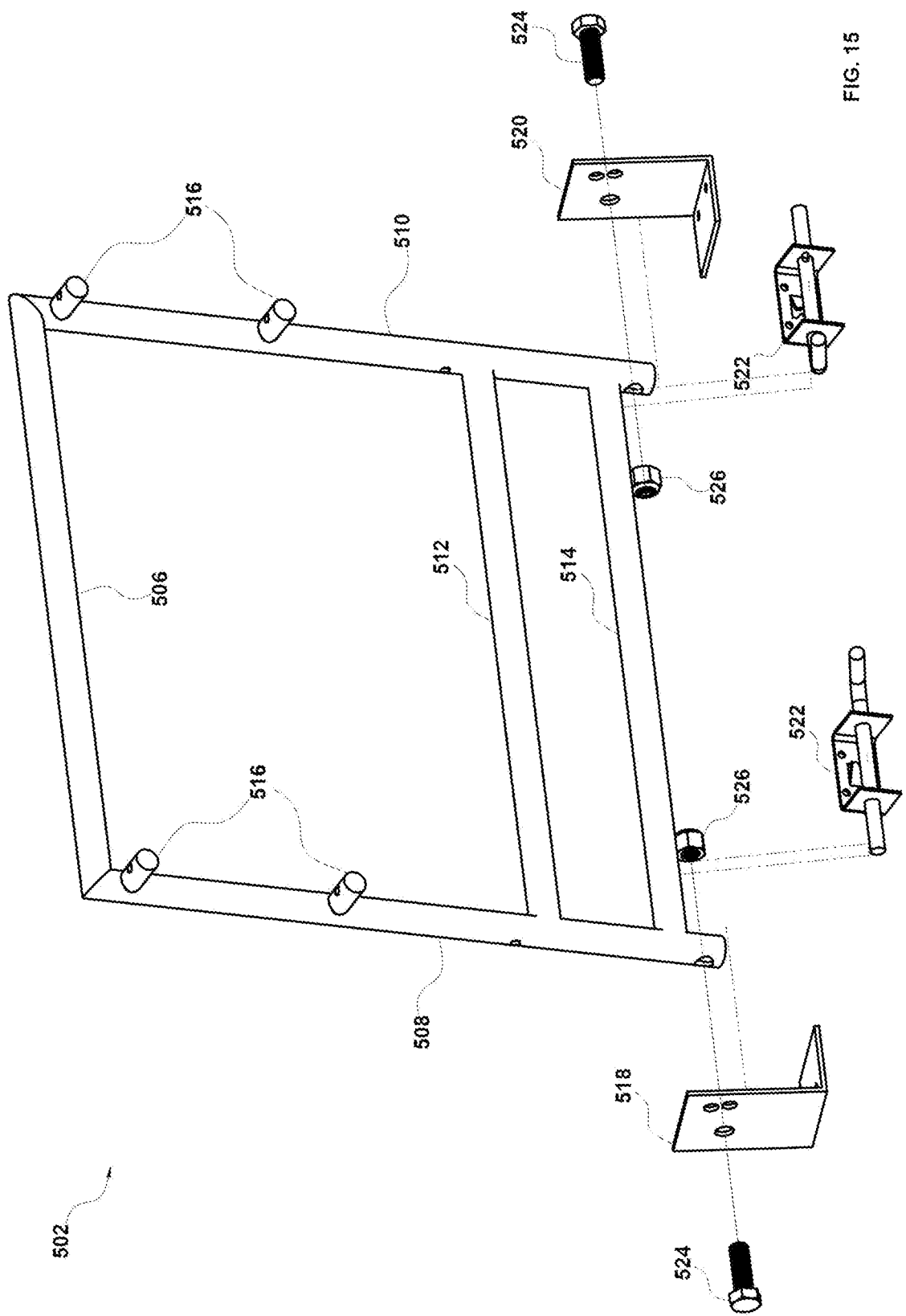

MANUALLY PROPELLED FLOATING AQUATIC WHEELCHAIR

This patent application claims benefit of U.S. Patent Application Ser. No. 63/178,512 filed 22 Apr. 2021, the entire disclosures of which are incorporated by reference herein.

BACKGROUND

This disclosure relates to an aquatic wheelchair where the human occupant can float, propel, and maneuver themselves in water.

The present invention comprises a human powered land and amphibious vehicle that allows active paraplegic individuals to enter and exit a swimming pool by rolling up and down an entry ramp, float on their own, and maneuver through the water. The original design has flotation that is in line with the center of gravity on either side of the individual to prevent tipping. This invention also includes a system of gears that connect manual wheel movement to propellers located below and behind the human occupant. A large drive gear attached to a main wheel provides the torque needed to spin the propellers at a high rotational velocity and bevel gears change the axis of rotation by 90 degrees. The change of the axis of rotation creates an axis of rotation that is perpendicular to the axis of rotation of the side wheel. This gear system incorporates gear ratios that optimize the work required to achieve high angular velocity to the propellers which increases thrust.

The following is a list of desirable features for a manually propelled floating aquatic wheelchair (a) Embodiments of the present invention can allow individuals to enter a swimming pool with a sloped ramp entry and float as the water level starts to exceed the height of the chair as a result of closed-cell foam floatation devices placed around the arms and back of the chair.

(b) Embodiments of the present invention can allow the human occupant to propel and maneuver the aquatic wheelchair via rotation of the side wheels. The same push and pull rotation force of the wheel allows the human occupant to maneuver forwards, backwards in the water while simultaneously rotating the side wheels the same direction accordingly. Additionally, the human occupant can spin the side wheels simultaneously in opposite directions to turn 360 degrees either direction.

(c) Embodiments of the present invention are resistant to corrosion in salt water and chlorinated swimming pool environments.

(d) Embodiments of the present invention can allow human occupants to secure themselves to the chair by means of an easy release strapping mechanism in cases of emergency.

(e) Embodiments of the present invention can allow for adjustment of the position of the back of the chair by means of two spring-loaded latch pins located behind the seat to allow for several seating positions.

(f) Embodiments of the present invention can hold one individual and withstand a capacity of 250 pounds.

(g) Embodiments of the present invention have the propulsion and gearings systems surrounded by plastic housings and stainless-steel gear boxes to protect the human occupant and adjacent individuals from the moving propellers and gears.

(h) Embodiments of the present invention have flotation that is designed to be in line around the center of gravity of the human occupant and wheelchair to provide stability and reduce chances of tipping.

(i) Embodiments of the present invention include the ability to add supportive padding when needed to help keep the human occupant centered in the chair.

BRIEF DESCRIPTION OF THE DRAWINGS

This disclosure is described in conjunction with the appended figures in which:

FIG. 14 Show the backrest frame of the H2O & GO;

FIG. 15 Shows a partially exploded view of the backrest frame to indicate how the backrest adjustability features are assembled.

Figure 1:
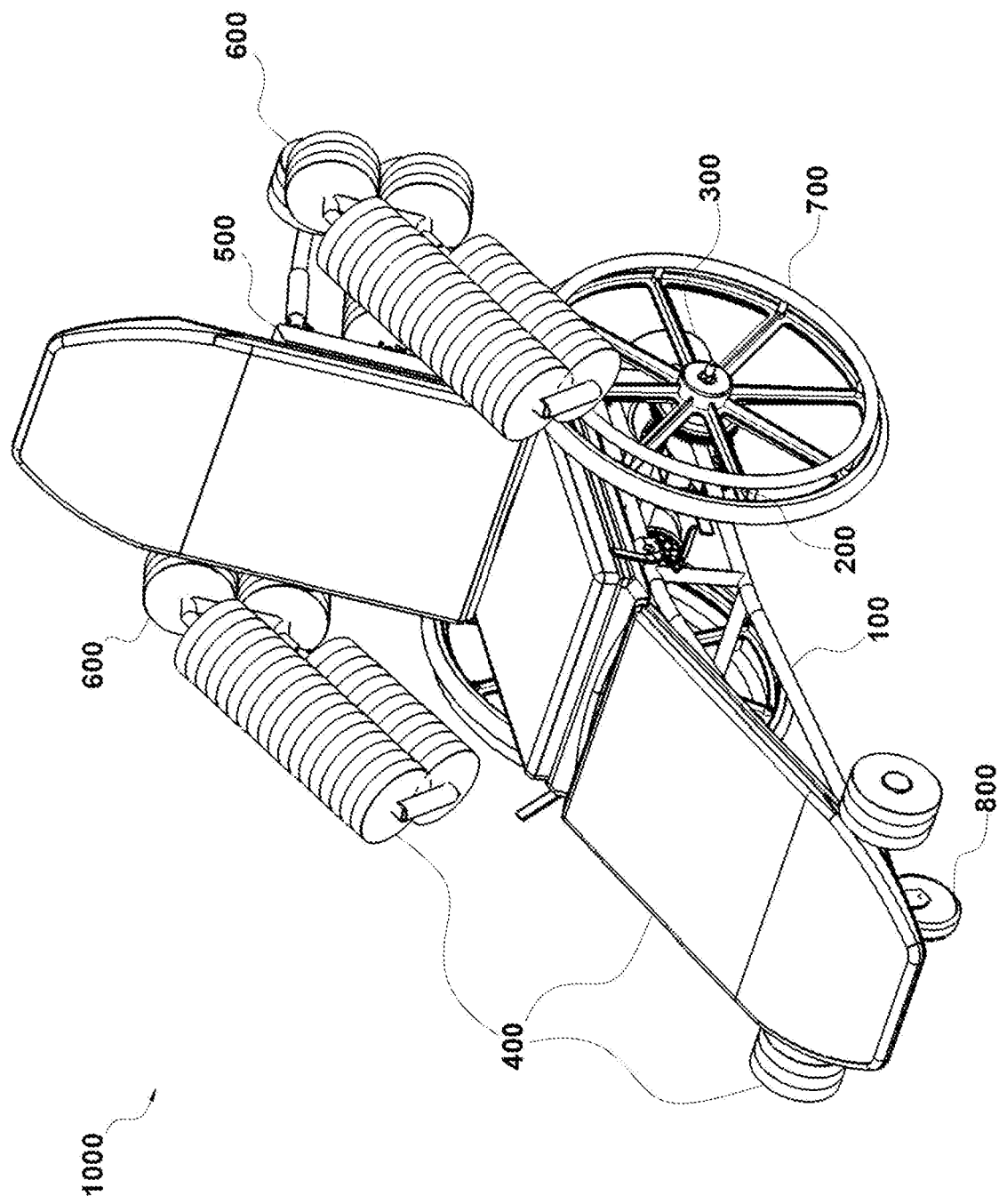
FIG. 1 Shows an isometric view the of the H2O & GO.

It should be understood that the drawings are not necessarily to scale. In certain instances, details that are not necessary for an understanding of the invention or that render other details difficult to perceive may have been omitted. It should be understood that the invention is not necessarily limited to the particular embodiments illustrated herein.

To assist in the understanding of embodiments disclosed, the following list of components or features and associated numbering found in the drawings is provided herein:

| Number | Component or Feature |
| --- | --- |
| 100 | Frame Assembly |
| 102 | Brake Assembly |
| 104 | Front Wheel Bracket |
| 106 | Frame Right Upper |
| 108 | Frame Left Upper |
| 110 | Frame Right Lower |
| 112 | Frame Left Lower |
| 114 | Frame Crossmembers |
| 116 | Front Frame Risers |
| 118 | Rear Frame Risers |
| 120 | Frame Gear Hub |
| 122 | Frame Wheel Hub |
| 124 | Backrest Bolts |
| 126 | Backrest Nuts |
| 128 | Brake Bolts |
| 130 | Brake Nuts |
| 132 | Brake Washers |
| 200 | Gears Assembly |

-continued

| Number | Component or Feature |
|---|---|
| 202 | Main Gear |
| 204 | Pinion Gear |
| 206 | Threaded Rod |
| 208 | Wheel Gearbox |
| 210 | Propeller Gearbox |
| 212 | Sleeve Bearing |
| 214 | Stainless Steel Ball bearing |
| 216 | Retaining Ring Clip |
| 218 | Gear Screw |
| 220 | Gear Shaft |
| 222 | Propeller Shaft |
| 224 | Small Bevel Gear |
| 226 | Large Bevel Gear |
| 228 | Gearbox Bolts and Nuts |
| 300 | Propulsion Assembly |
| 302 | Propeller Duct |
| 304 | 6 Blade Propeller |
| 306 | Propeller Duct Extension |
| 308 | Fastening Bolts and Nuts |
| 400 | Flotation |
| 402 | Float Bar Assembly |
| 404 | Float Bar |
| 406 | EVA Foam |
| 408 | Body Board |
| 410 | Seat Cushion |
| 500 | Backrest Assembly |
| 502 | Backrest Frame |
| 504 | Backrest Bolts and Nuts |
| 506 | Top Bar |
| 508 | Left Bar |
| 510 | Right Bar |
| 512 | Back Support Bar |
| 514 | Bottom Bar |
| 516 | Pontoon Mounts |
| 518 | Left Bracket |
| 520 | Right Bracket |
| 522 | Spring Loaded Latch Pins |
| 600 | Pontoon Assembly |
| 602 | 180 Degree Bent Bar |
| 604 | Pontoon Arms |
| 606 | Padded Hand Grips |
| 700 | Back Wheelchair Wheel |
| 800 | Front Caster Wheel |
| 1000 | Full H2O & GO Assembly |
| 1002 | Water propulsion unit. |

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment.

It should be understood that various changes could be made in the function and arrangement of elements without departing from the spirit and scope as set forth in the appended claims. Preferred embodiments of the present invention are illustrated in the Figures, like numerals being used to refer to like and corresponding parts of the various drawings. Specific details are given in the following description to provide a thorough understanding of the embodiments. However, it will be understood by one of ordinary skills in the art that the embodiments may be practiced without these specific details.

1. Definitions

For purposes of describing embodiments of the present invention and claims, a side wheel (hereinafter also called: "first side wheel" or "left wheel" and "second side wheel" or "right wheel" and "Back Wheelchair Wheel" and "side wheels") is defined as a standard wheelchair wheel with an attached handrail. The bearings in the side wheels were replaced with matching corrosive resistant stainless-steel bearings.

For purposes of describing embodiments of the present invention and claims, a human powered land and amphibious vehicle (hereinafter also called "H2O & GO"™) is defined as the first human powered land and amphibious vehicle having side wheels that are configured for people with disabilities to sit in the chair of the vehicle and exclusively provide human-power. The human-power will be transmitted through the side wheels to traverse around on land, and in the water the human-power is transmitted to propellers to move through the water. Examples of the human-power transmission on land is most like that of normal wheelchair operation, while the human-power transmission in the water is similar to that of a boat with a propeller, however the embodiments of this invention are solely human-powered. This human-power is provided by the human occupant's arm and upper body strength acting on the side wheels during the operation of the chair.

For purposes of describing embodiments of the present invention and claims, a zero depth entry swimming pools (hereinafter also called a "swimming pools with a sloped ramp entry") is defined as an indoor human-made body of water with one or more sides that gradually slopes to transition from land to water without the use of steps or any sort of drop that would make transition from land into water more difficult. The slope of the ramp entry, according to the International Swimming Pool and Spa Code, cannot exceed a slope ratio of 1:7. This means the slope cannot exceed 1 foot of depth per seven feet of horizontal distance.

2. Overview of Embodiments of the System and Method

It should be noted that embodiments of the present invention can incorporate any combination of the above attributes in any combination and configuration capable of being understood by anyone skilled in the art.

3. Description of Embodiments

Figure 2:
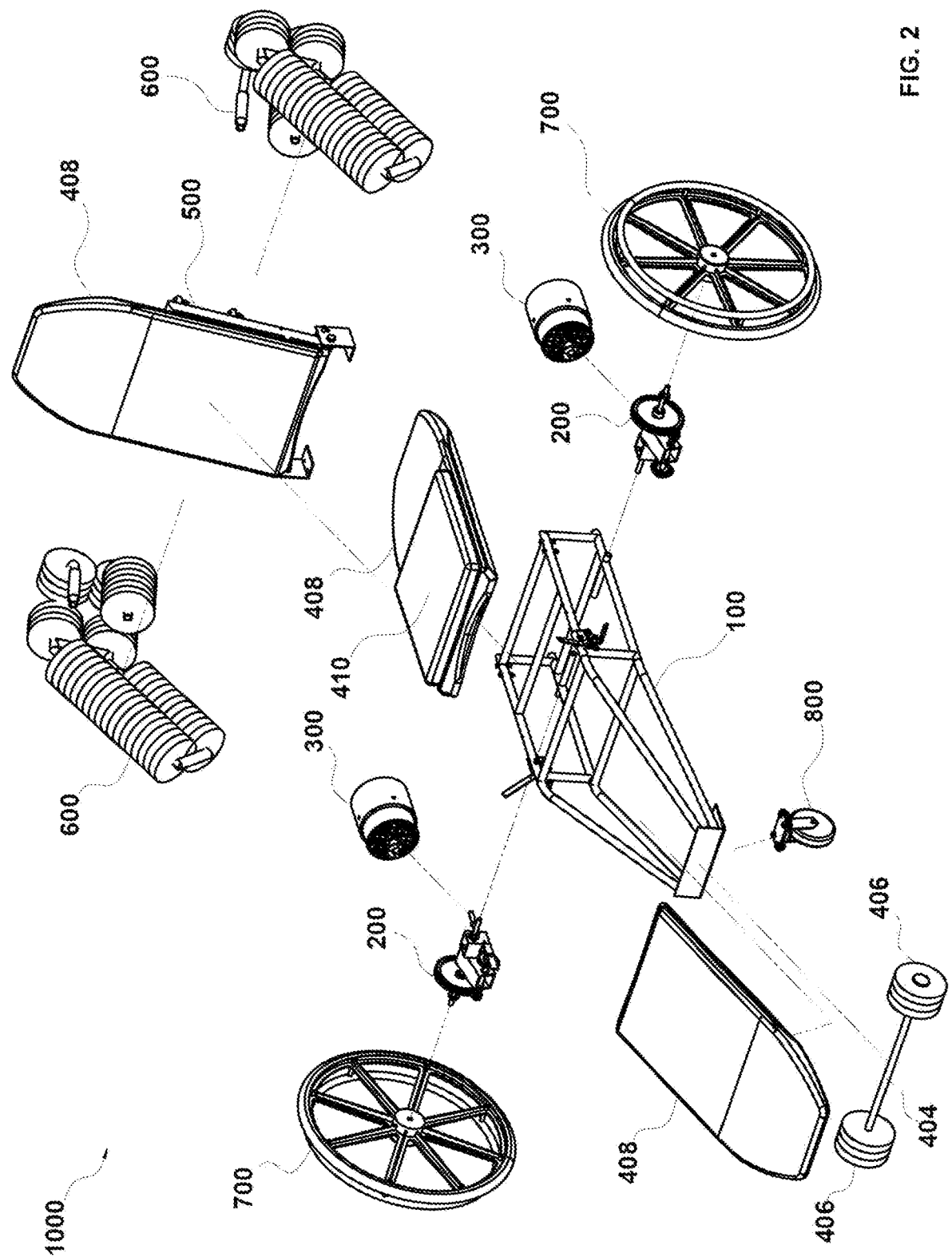
FIG. 2 Shows an isometric exploded view of the H2O & GO.
Figure 3:
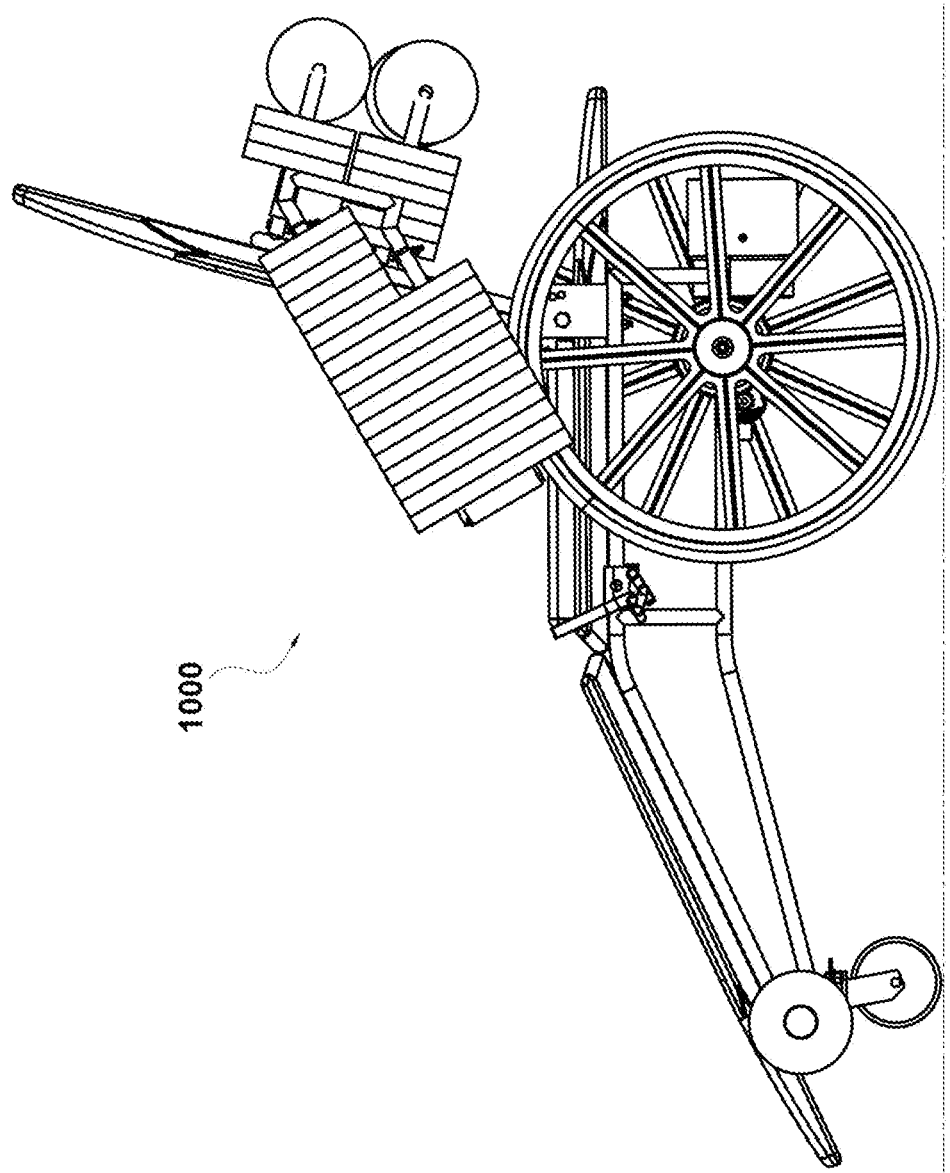
FIG. 3 Is a representation of the H2O & GO while on land.
Figure 4:
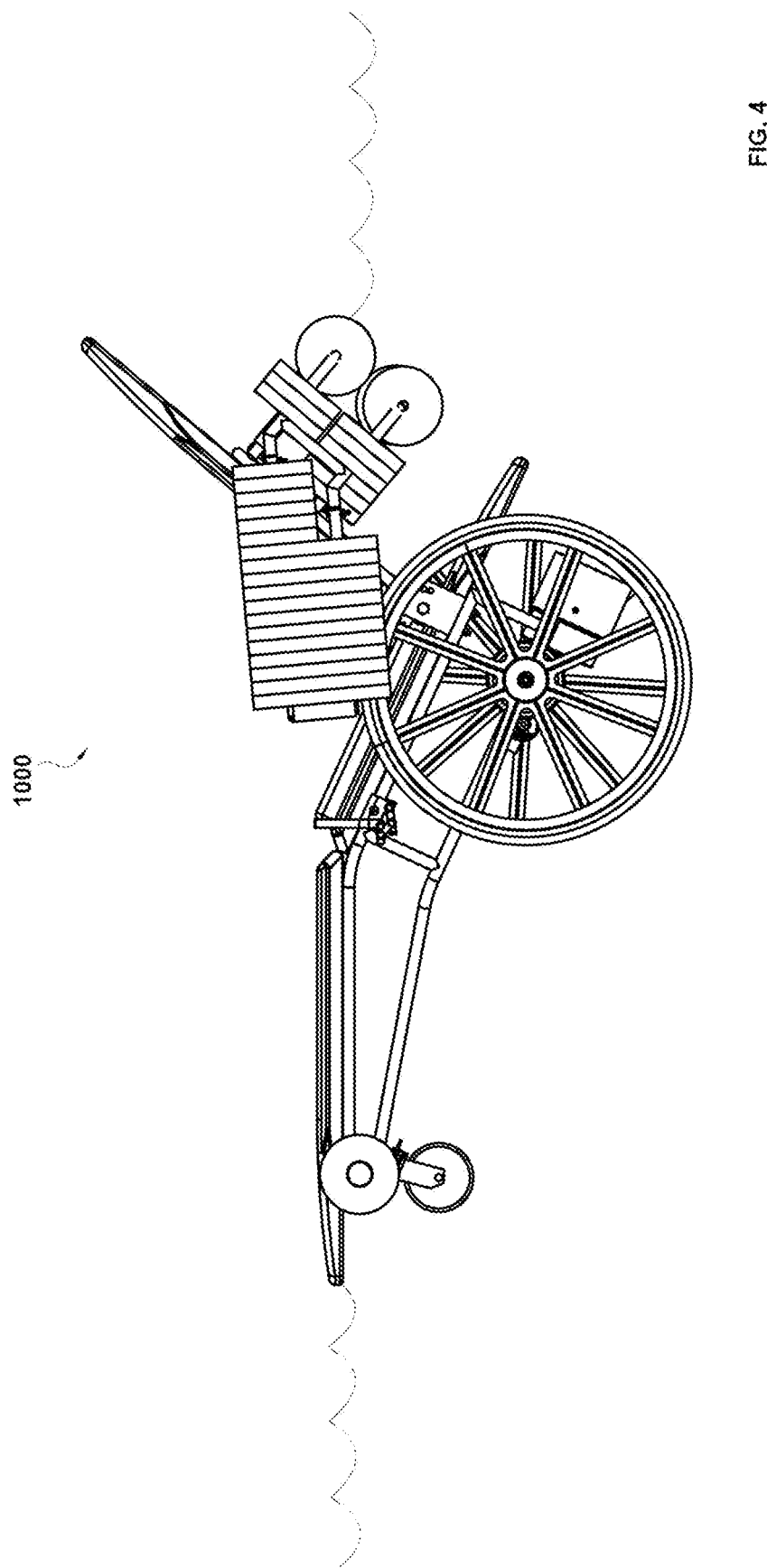
FIG. 4 Is a representation of the H2O & GO while in the water.

FIG. 1 and FIG. 2 illustrate the ideal embodiment of the H2O & GO, which was designed to be amphibious and therefore, was constructed out of corrosion resistant material to reduce the effects that a chemical rich environment has on the durability of the material, and to decrease the need for maintenance. FIG. 3 is a side view of the ideal embodiment assembled on level ground. A welded stainless steel frame assembly 100, backrest assembly 500, and pontoon assembly 600 is assembled with the brake assembly 102 and the back wheelchair wheel 700 and the front caster wheel 800. To understand the configurations of the H2O & GO, it is best to start with FIG. 2, which illustrates an exploded view of FIG. 1. Adequate floatation is needed to maintain the submersion level required by the human occupant and to stabilize the H2O & GO while it's in the water. In the ideal embodiment of the H2O & GO, styrofoam body boards 408 are affixed to the frame assembly 100 and the backrest assembly 500 with nylon velcro strapping. The body boards are cut and the velcro is fed through to wrap around the pipes of either the frame assembly 100 or the backrest assembly 502. In the ideal embodiment, a seat cushion 410 is placed on the central seating body board to act as cushion for the user. In alternate embodiments, the seat cushion 410 could be integrated into the middle seating body board 408 or may not be included at all. To achieve stability while floating in the water Ethylene-Vinyl Acetate (EVA) closed-cell foam floats 406 are placed around and along the detachable stability pontoon assembly 600 and the front float bar 404 to help maintain balance in the water. The stability pontoon assemblies 600 are bolted to the pontoon mounts 516 on the backrest frame assembly 502 which is bolted to the frame assembly 100. The float bar assembly 402 is affixed to the frame and held in place close to the front wheel bracket 104 using nylon straps. In alternative embodiments the float bar assembly 402 could be held in place with corrosive resistant brackets. The float bar assembly 402 consists of a float bar 404 with EVA foam 406 placed on both ends. In the ideal embodiment and for ideal flotation, this float bar 404 was made of PVC piping. In alternative embodiments, the float bar 404 could be made of other corrosive resistant piping that could withstand being in close contact with the material used for the frame assembly 100 in a chemical rich environment. The flotation 400 is designed to support a 250-pound human occupant in addition to the weight of the frame with the level of submersion reaching above the abdomen as indicated in FIG. 4. The brake assembly 102 is made from stainless steel sheet metal and has been bolted to the side of the frame on the frame upper right 106 and frame upper left 108 tubes. The positioning of the brakes is based on the size of the back wheelchair wheel 700. The back wheelchair wheel 700 connects to the frame wheel hub 122 and the gear system assembly 200 is attached to the frame gear hub 120. A corrosive resistant stainless steel threaded rod 206 is inserted through the frame assembly 100 inside the hubs and fixes the back wheelchair wheel 700 and the gear system assembly 200 in place with standard corrosion resistant nuts and washers. A regular wheelchair's wheel with the internal steel bearings replaced with corrosive resistant stainless-steel bearings is used for the back wheelchair wheel 700. The front caster wheel 800 is bolted to the frame assembly 100 with standard corrosive resistant fasteners. The ideal embodiment of the front caster wheel 800 is a caster wheel made of a corrosive resistant material, such as stainless steel and polymer materials. The propulsion assembly 300 is a human-powered ducted propeller system that is attached to gear system assembly 200 and then positioned relative to the lower rear frame crossmembers 114 on the frame. The gearing system assembly 200 is attached to the back wheelchair wheels 700 using corrosive resistant bushings 212 pictured in FIG. 8.

Figure 5:
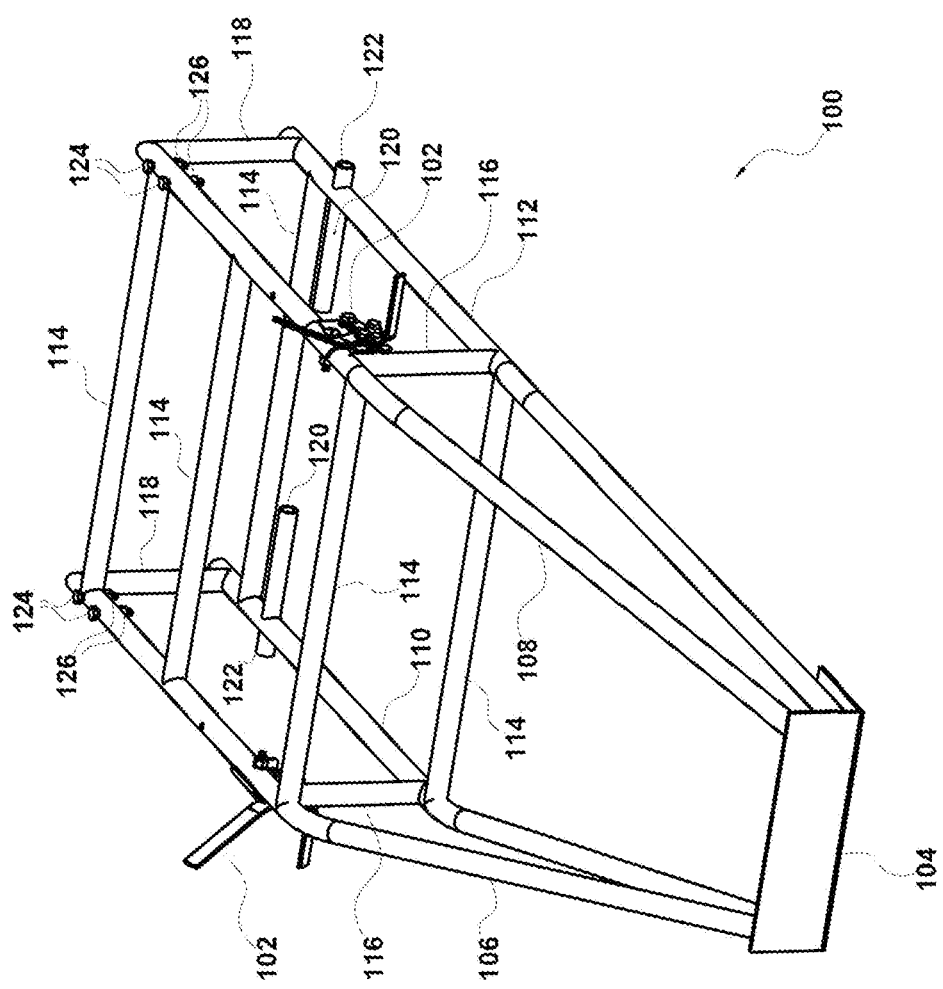
FIG. 5 Shows the final rendition of the frame design.
Figure 6:
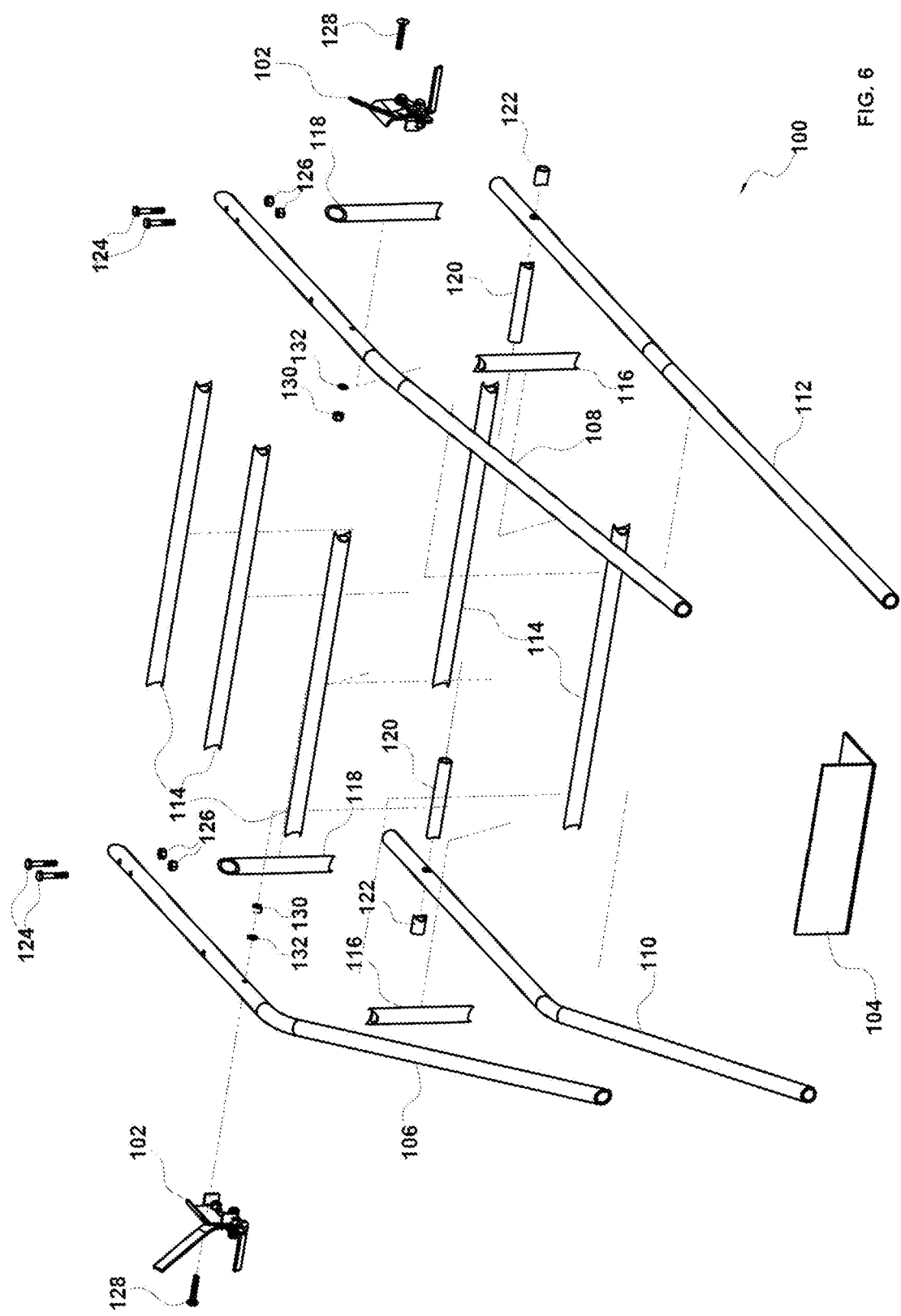
FIG. 6 Shows an exploded view of the frame design.

FIG. 5 illustrates the ideal embodiment of the frame assembly 100 weldments for the present invention and FIG. 6 is an exploded view of FIG. 5. Frame assembly 100 comprises of corrosion resistant pipes or tubes. For ease of welding or joining of the frame assembly 100, frame crossmembers 114, front frame risers 116 and rear frame risers 118 are coped at connection points to minimize the gap between joined members and reduce the amount of welding needed to be performed. In addition, one or more ends of the frame right upper 106, frame left upper 108, frame right lower 110, frame left lower 112 and frame crossmembers 118 are cut in distinct angles to eliminate gaps in welding. In alternative embodiments, these pipes could be made out of different materials such as metals (like stainless steel), polymers (like PVC pipes), composites (like carbon fiber), or other materials and joined using common joining methods for the material used. The frame right upper 106, frame left upper 108, frame right lower 110, and frame left lower 112 are bent to form the sides of the frame and extend from where the seat is attached to the front wheel bracket 104. The radius of curvature could be larger on the upper frame in comparison to the lower relative to the horizontal plane. The curvature would mainly depend on the size of the frame. These bends would originate in a location according to seat placement and sized accordingly. The front frame risers 116 and the rear frame risers 118 connecting the two upper and two lower frame sections vary in length based on the back wheelchair wheel 700 diameter to obtain seat heights according to ADA standards. Spacing of frame crossmembers 114 depends on gear mechanism mounting locations and the positioning of the backrest. The frame wheel hubs 122 are coped and act as hubs and/or spacers for moving components. The internal frame gear hub 120 is a concentric mount for the gear system assembly 200. This allows adjustments to be made to the angle of the ducted propulsion assembly 300. The frame gear hub 120 length depends on mounting location for the propeller shaft and may be replaced by a crossmember. The push-to-lock brake assembly 102 is located relative to the rear wheelchair wheel 700 when they are attached to the frame assembly 100. These brake assembly 102 is attached to the frame assembly 100 with brake nuts 130, brake bolts 128, and brake washers 132 to ensure a tight fit to allow the component to lock the back wheelchair wheel 700 as intended. Backrest nut 126 and backrest bolt 124 are used to mount the backrest assembly 500.

Figure 7:
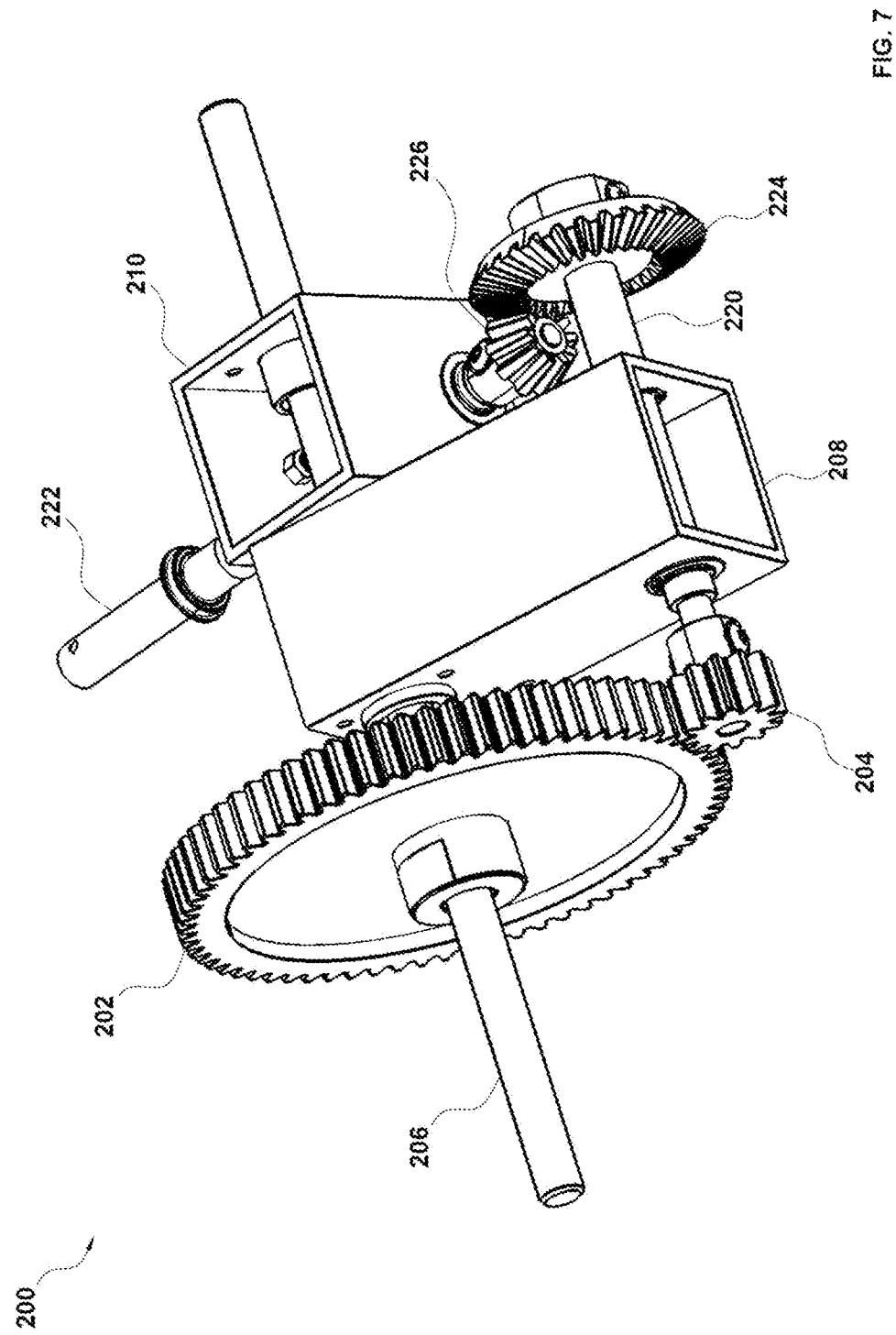
FIG. 7 Shows the gear system assembly.
Figure 8:
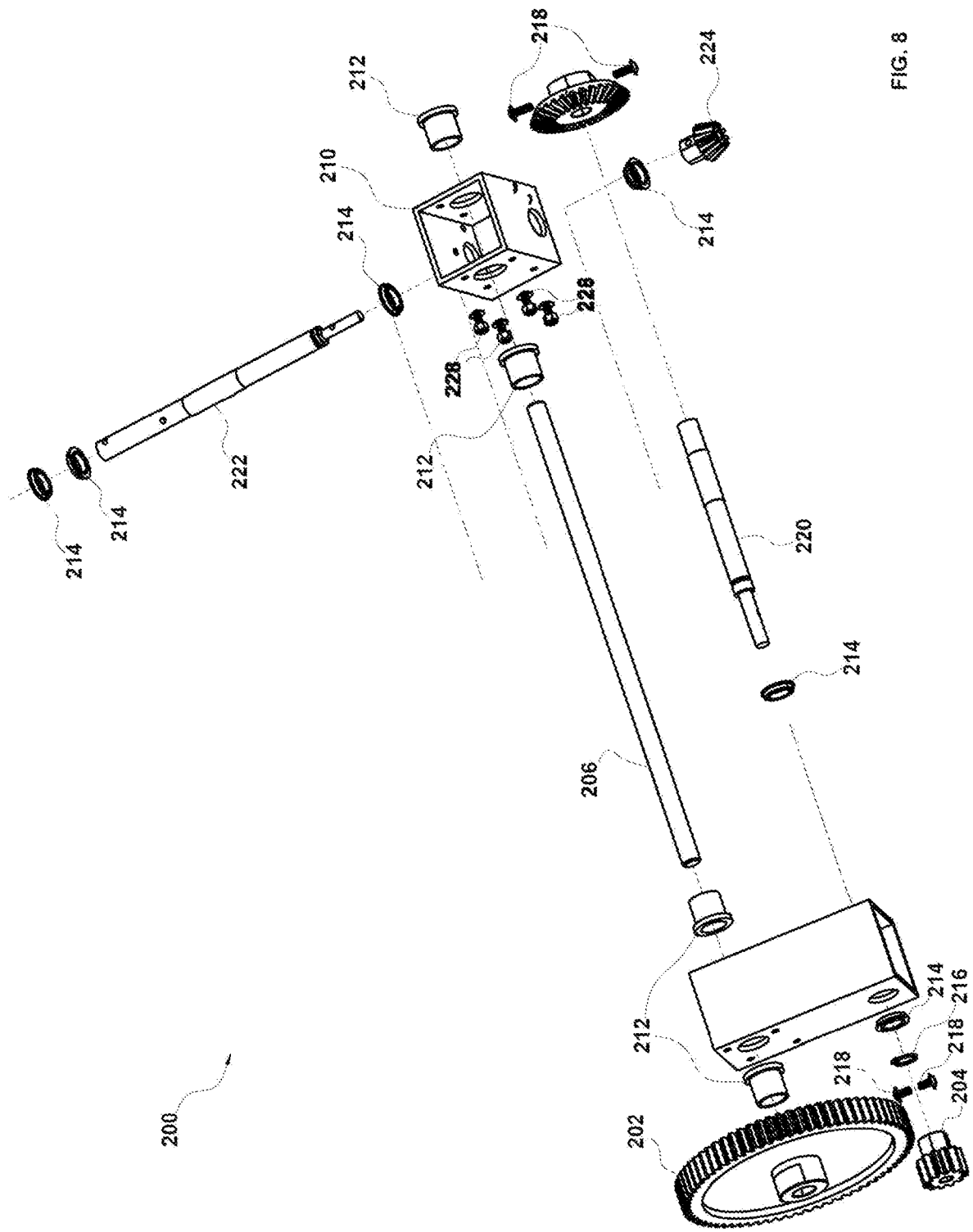
FIG. 8 Shows an exploded view of the gear system assembly.

FIG. 7 is a representation of the ideal embodiment of the gear system assembly 200. FIG. 8 is an exploded view of the gear system assembly 200. The sleeve bearings 212 on the frame's gear hub 120 and frame's wheel hub 122 prevent the main gear 202 and threaded rod 206 from excessive wear and reduce friction on the wheel gearbox 208 and propeller gearbox 210 allowing for easier adjustment and maintenance. The shielded stainless steel ball bearings 214 do not require lubrication and are pressed into both the wheel gearbox 208 and the propeller gearbox 210. The distance between the main gear 202 and pinion gear 204 are determined by the gear ratio and diameter pitch as needed, therefore, the length of the propeller shaft 222 is determined by variable circumstances. Because the propulsion assembly 300 should be located close to the sides of frame 100, the lengths of the gear shaft 220 are determined by the diameter of the 6 bladed propeller 304 as well as the size of the propeller duct 302 and propeller duct extension 306. The gear screws 218 are threaded through the pinion gear 204, bolting it to gear shaft 220. In the ideal embodiment of the gear train, the large bevel gear 226 is mechanically coupled to the gear shaft 220 with gear screws 218. A retaining ring clip 216 secures the gear shaft 220 inside the wheel gearbox 208. The gear shaft 220 and propeller shaft 222 are positioned with stepped diameters that restrict movement while riding against the stainless-steel ball bearings 214. The gear shaft 220 and propeller shaft 222 are then held in place in the propeller gearbox 210 with a retaining ring clip 216 on the opposing side. The small bevel gear 224 is bolted to the propeller shaft 222 using gear screws 218. The wheel gearbox 208 is aligned with the propeller gearbox 210 and bolted in place using gearbox bolts and nuts 228. The inner frame gear hub 120 and the sleeve bearings 212 align the wheel gearbox 208 and propeller gearbox 210 in parallel and cylindricity. However, the wheel gearbox 208 and propeller gearbox 210 are offset by a rotational alignment. In alternative embodiments the pinion gear 204, large bevel gear 226 and small bevel gear 224 can be fixed for rotation to the gear shaft 220 and propeller shaft 222 with a keyway or integrated into the rotating shaft as necessary.

Figure 9:
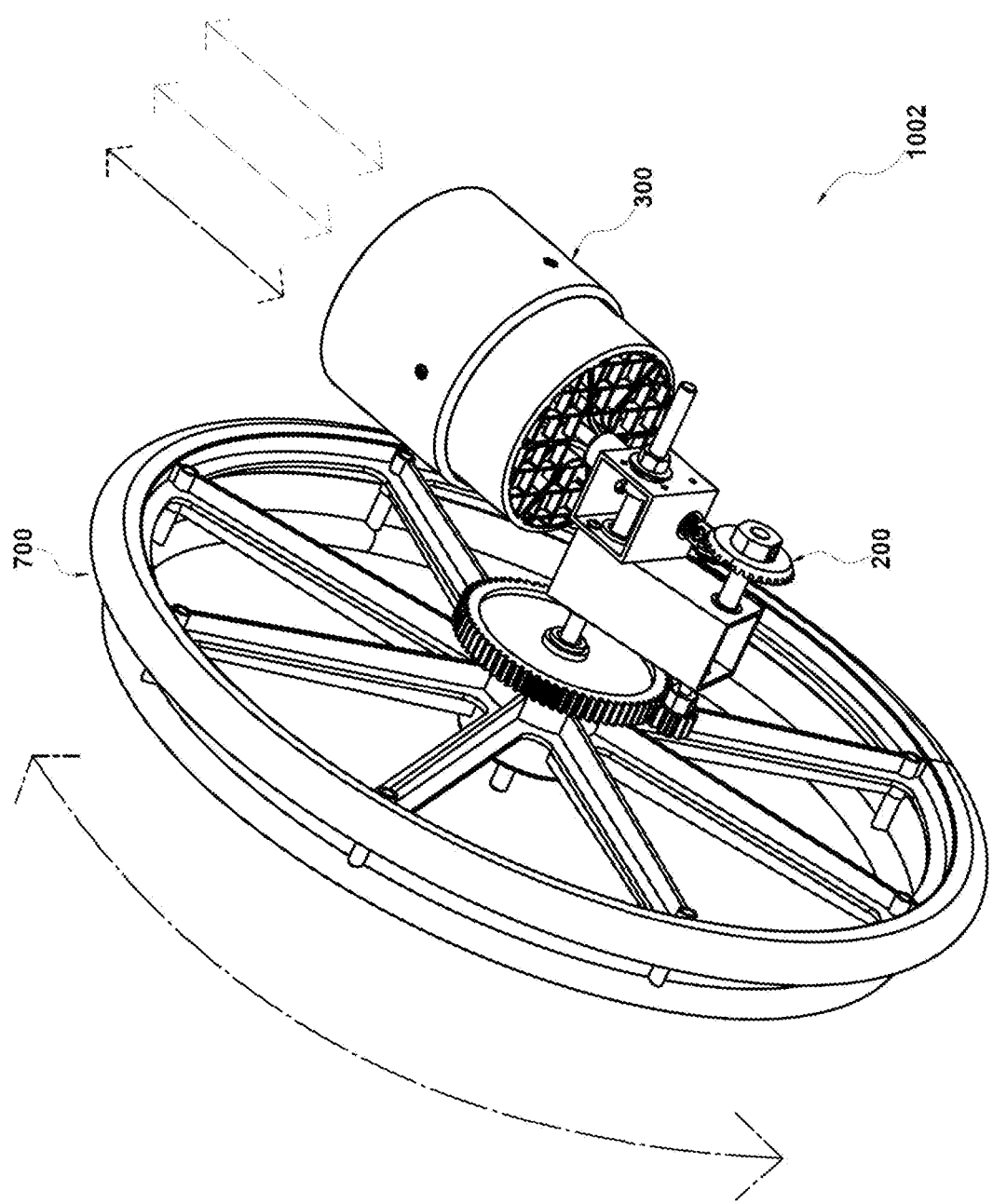
FIG. 9 Shows a graphical representation of the action of the wheel being converted to power to the propellers via the gear mechanism.
Figure 10:
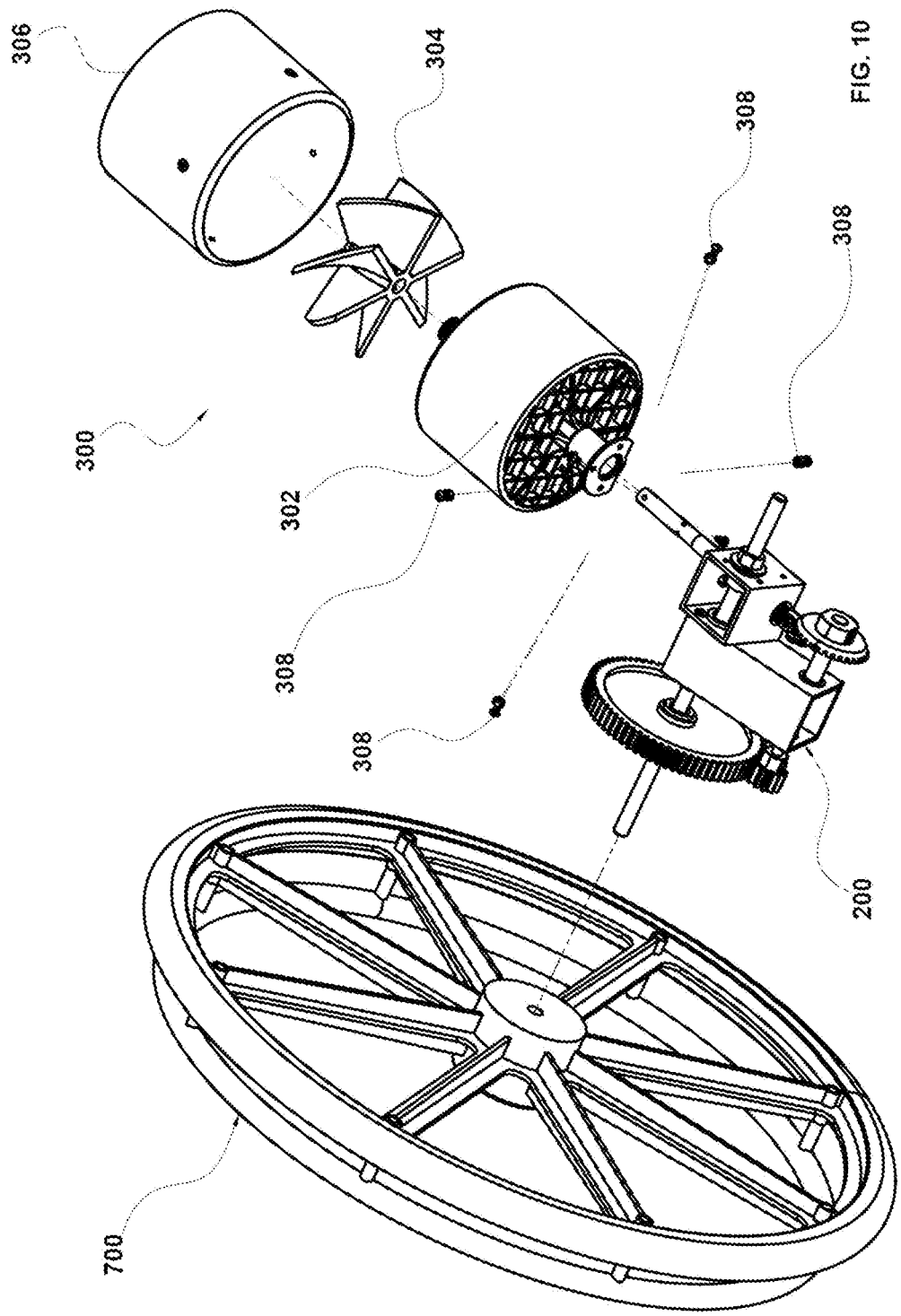
FIG. 10 Shows an exploded view of the wheel-to-gear-to propeller mechanism.

FIG. 9 illustrates the ideal embodiment of the whole gear train mechanism and interactions of the water propulsion unit 1002 and illustrates how the gear assembly 200 and the back wheelchair wheel 700 interact to cause the propulsion assembly 300 to work. FIG. 10 is the exploded view of FIG. 9 and in the ideal embodiment of the water propulsion unit 1002, a human occupant will create torque and angular velocity on the back wheelchair wheel 700 using the wheel's handrails. The torque and angular velocity are harnessed and transferred to the gear assembly 200 and the energy is converted into thrust by increasing the propeller angular velocity. The harnessed torque is transmitted to the pinion gear 204 through the main gear 202 which drives the gear shaft 220 at a higher angular velocity. The gear shaft 220 is used to transfer the harnessed torque to a large bevel gear 224 and the small bevel gear 226 changing the axis of rotation 90 degrees and continuing increasing the angular velocity. The higher angular velocity and remaining harnessed torque acts on the propeller shaft to create propulsive thrust by spinning the ducted propeller 304. The ideal embodiment has a gear ratio range of 1:2 through 1:25 depending on the optimization of propeller design. The main gear 202 is affixed to the back wheelchair wheel 700 which is attached to the frame wheel hub 122 by the threaded rod 206 and a standard corrosive resistant nut and washer. In alternative embodiments, the main gear 202 could be incorporated into the back wheelchair wheel 700 as part of the production thereof. Furthermore, mass components could be added to the back wheelchair wheel 700 to capture centrifugal driving forces. Mass components could include dead weight or pockets built in that fill with water. These pockets should be designed in such a way that the water mass is not displaced centrifugally. The pinion gear 204 is attached to the rotating shaft 220 in gear assembly 200 which is held in place by sleeve bearings 212 and frame gear hub 120. Gear assembly 200 could be shielded or housed in or on alternate materials such as molded plastic or other suitable corrosion resistant materials. The ducted propulsion assembly 300 was developed as a proof of concept. In the ideal embodiment of the propulsion assembly 300, 6 blade propeller 304 is a six bladed corkscrew propeller with pitch angels chosen to be manufacturable on a 4-axis CNC machine. The inner propeller duct 302 is fixed to the gear assembly 200 and propeller shaft 222 runs through a hole in the center of the propeller 304. The outer propeller duct extension 306 is bolted to the inner propeller duct 302 with fastening bolts and nuts 308. The inner propeller duct 302 and outer duct extension 306 have been designed to optimize the flow of water. Specific grid lengths and distance of grid to the 6-blade propeller 304 are required to maintain a propulsive thrust. The grid patterns seen on propeller duct 302 are mainly incorporated for the safety of the human occupant and other individuals in the H2O & GO's vicinity. This grid is also on the face of the outer propeller duct extension 306 where the water flows out to the rear. Alternate designs or off the shelf propellers could be substituted for the 6 bladed propeller 304 therefore the propeller duct 302 and propeller duct extension 308 would be optimized for optimal propulsive thrust output according to the propeller used. The propellers spin opposite directions according to the rotational changes caused by the gear assembly 200. The left gear (with respect to the human occupant sitting in the chair) could rotate clockwise and the right gear could rotate counterclockwise depending on the angular displacement of the wheels.

Figure 11:
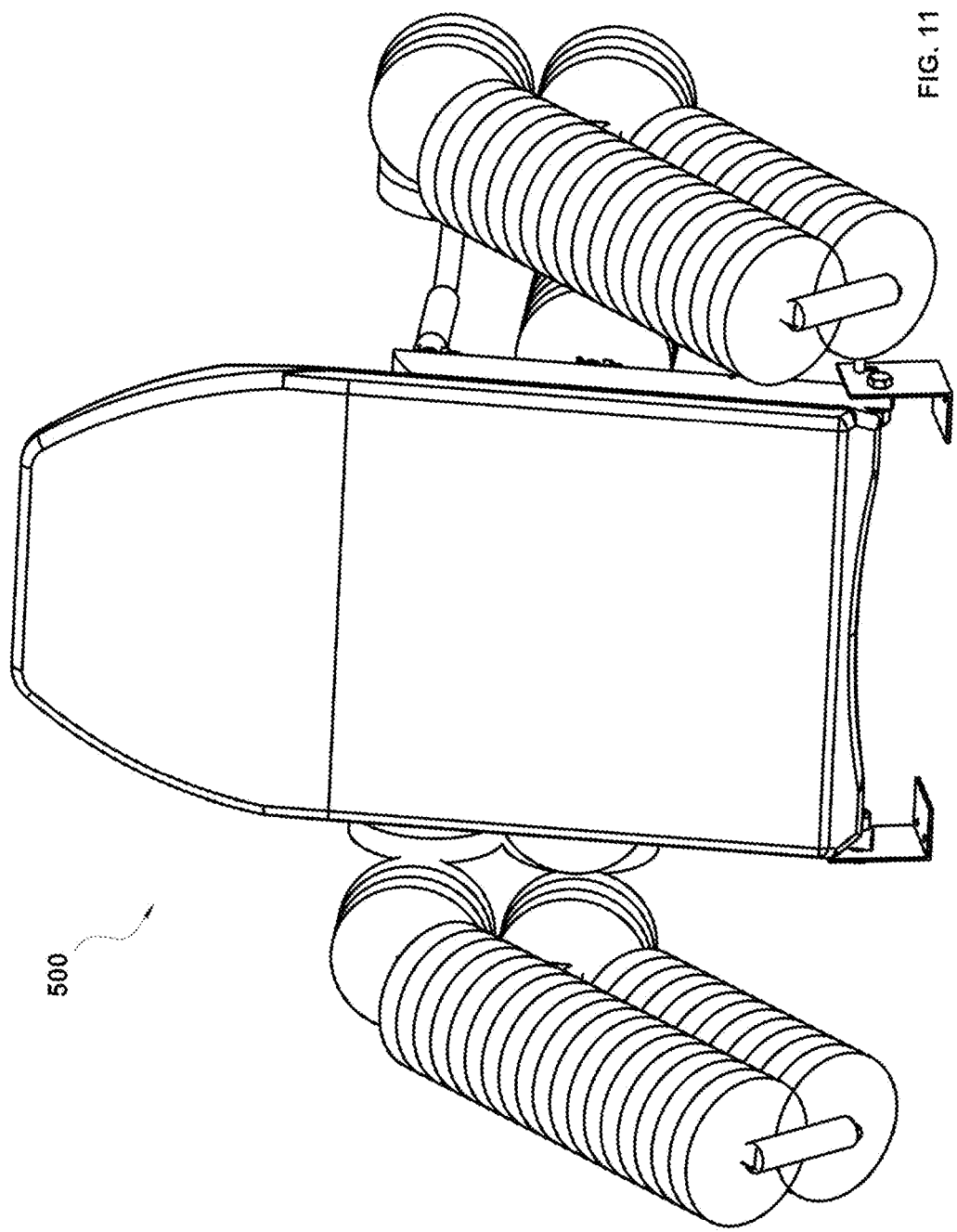
FIG. 11 Shows the backrest assembly of the H2O & GO.
Figure 12:
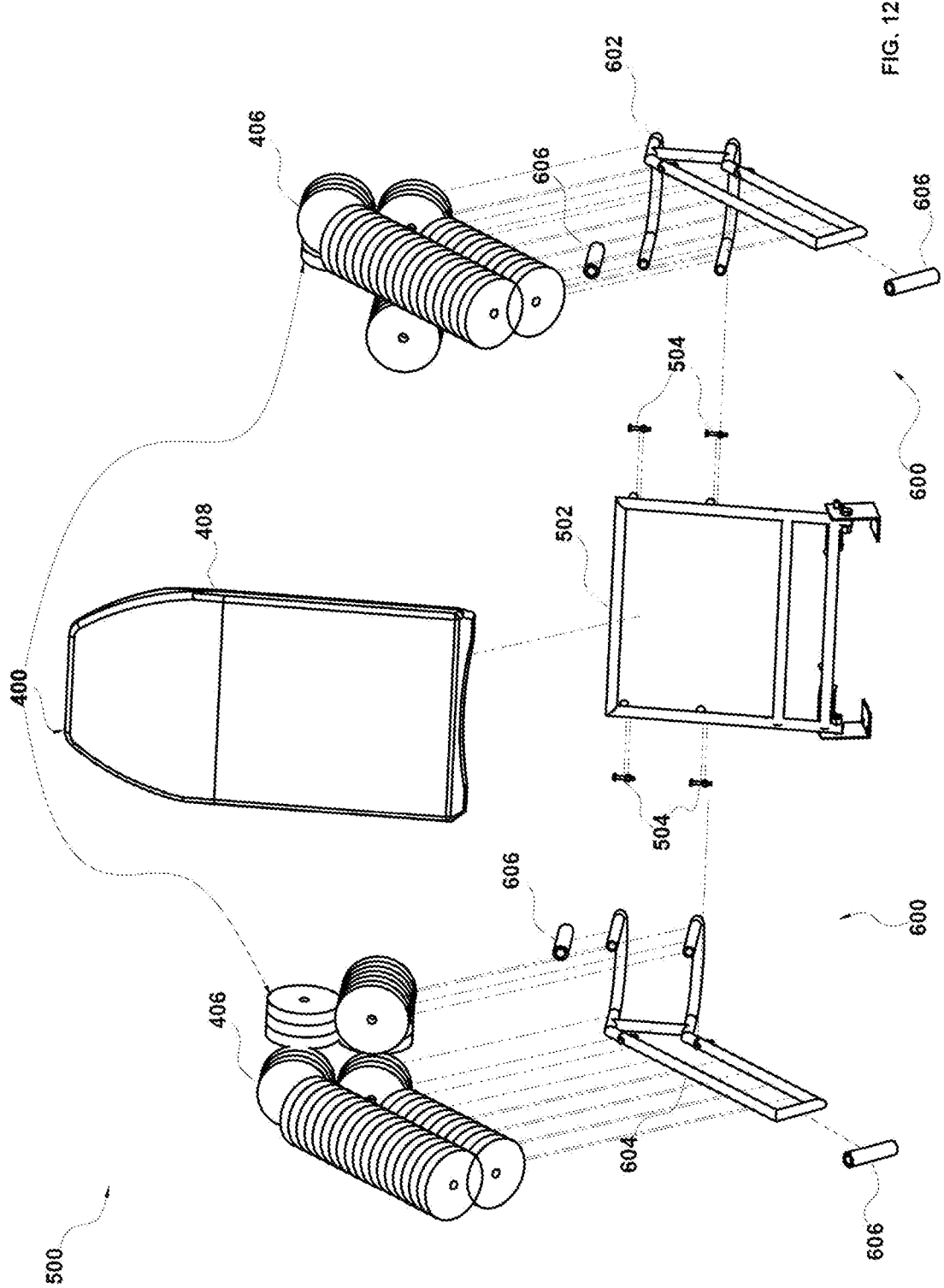
FIG. 12 Shows an exploded view of the backrest assembly.
Figure 13:
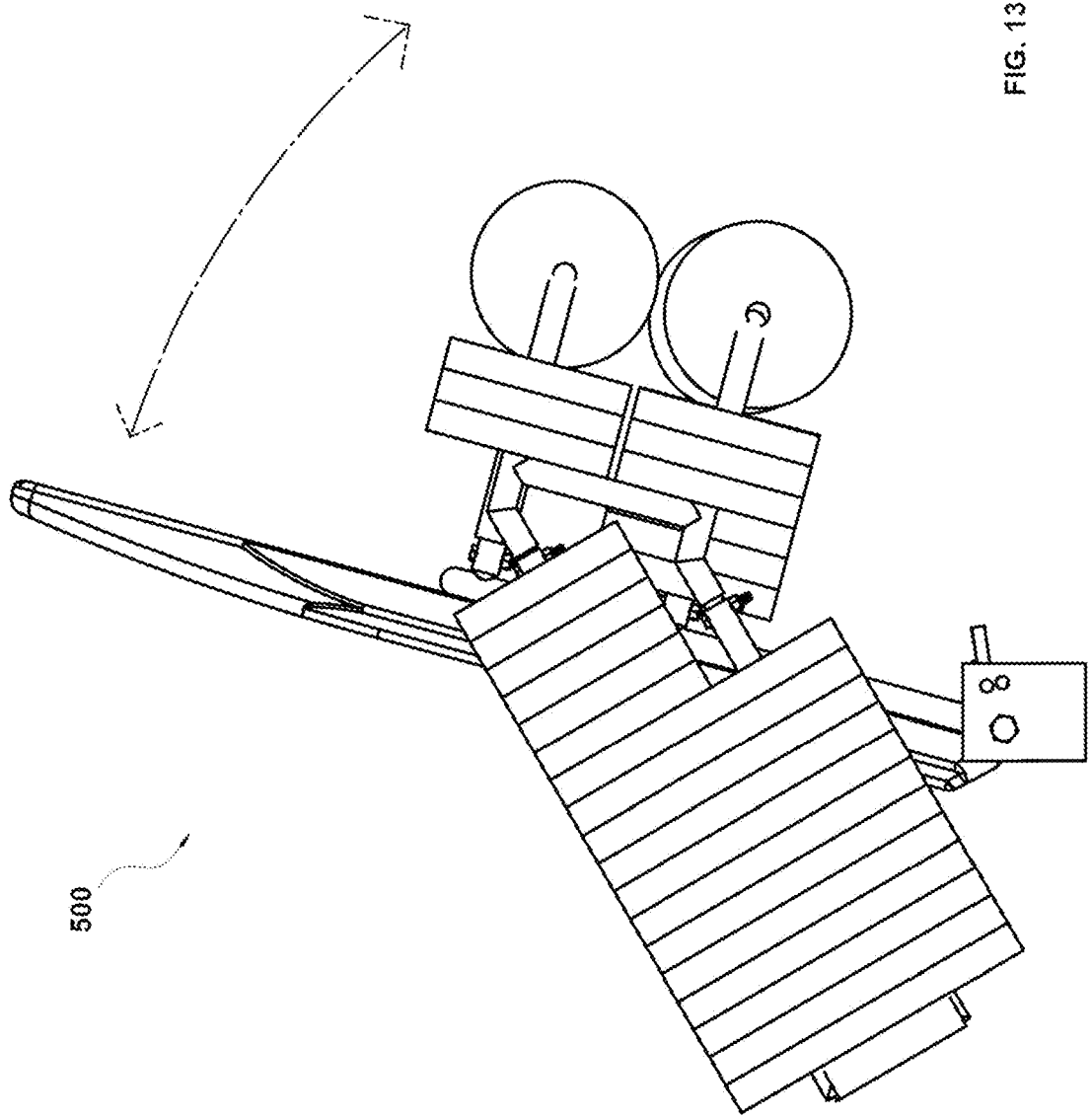
FIG. 13 Shows the backrest adjustability settings of the H2O & GO.

FIG. 11 is an illustration of the ideal embodiment of the backrest assembly 500 which incorporates the pontoon assembly 600. FIG. 12 is an exploded view of FIG. 11. The pontoon assembly 600 is secured to the backrest frame 502 with bolts and nuts 504 inserted into the pontoon mounts 516 which are identified in FIG. 14 on the back of the backrest frame 502. This way, the pontoon assembly 600 can be disassembled from the backrest assembly 500 when it is necessary for the H2O & GO to pass through doorways. The ADA requirements for wheelchair accessible doors is that they must be a minimum of 32 inches in width. With this in mind, the frame assembly 100 and backrest frame 502 should be able to fit through this size of door when the pontoon assemblies 600 are detached from the backrest assembly 500. Furthermore, to fit through this minimum size of ADA compliant doors, the width of the frame assembly 100 and the backrest assembly 500 without the pontoon assemblies 600 attached should be a maximum of 30 inches when the human occupant is included (this means the frame assembly 100 and backrest assembly 502 should have a width of around 27 inches). In alternative embodiments, the frame assembly 100 and the backrest frame 502 could be different sizes as long as they stay within these ADA constraints. The ideal embodiment of the pontoon assembly 600 contains corrosive resistant piping that can either be the same material as the frame or a material that would not corrode overtime in close contact with the frame material in a chemical rich environment. The pontoon assembly 600 consists of a set of parallel 180 degree bent bars 602 that curve from the backrest frame 502 180 degrees and connect to the pontoon arms 604. The bend radius was designed to allow the human occupant to have sufficient room on the sides to freely push and pull the back wheelchair wheel 700 along the rotational axis. Therefore, the pontoons are located approximately at elbow width apart from the human occupant's body, which is sufficient to prevent listing from side to side. The two sections of the pontoon assemblies are connected using corrosive resistant fasteners and can be removed to adjust the amount of EVA Foam 408 is used. The angle of the pontoon arms 604 are optimized to be nearly parallel with the water when the H2O & GO is floating as seen in FIG. 4. The upper and lower portions of the pontoon arms 604 are connected with a riser similar to rear frame riser 118 with both ends cut at an angle. The 180 degree bent bars 602 have a spacer similar to the front frame risers 116. In the ideal embodiment of the H2O & GO, the flotation on the pontoon assembly 600, consists of closed-cell EVA foam 406 placed around and along the lengths of the 180 degree bent bars 602 and the pontoon arms 604. The closed-cell EVA foam 406 are similar to swimming pool weights and have holes through their centers. The pipes of the pontoon assembly 600 are inserted through the hole in the foam and stacked against one another. The number of EVA foam 406 can be changed to allow for multiple modes of flotation 400. Additionally, the ideal embodiment has padded hand grips 606 that enable assistants to push or maneuver the H2O & GO similar to traditional wheelchairs and to make the pontoon assemblies 600 easier to carry and hold when detached. There are two pontoon assemblies 600, one on either side of the backrest assembly 500. The ideal embodiment has an adjustable backrest as seen in FIG. 13 that enables the human occupant to control the position of the backrest assembly 500 to sit more comfortably in the water. The backrest assembly 500 positioning can be changed by pulling the two spring loaded latch pins 522 out of the rest position, then changing angle as seen in FIG. 13 so that the spring-loaded latch pins 522 can engage into the holes of the left bracket 518 and right bracket 520. When tension is released from the spring-loaded latch pins 522 the pins go through the holes of left bracket 518 and right bracket 520, thus locking the backrest assembly 500 into its new position. FIG. 14 is a representation of the ideal embodiment of the backrest frame 502 and FIG. 15 is a partially exploded diagram of the backrest mounting brackets left bracket 518 and right bracket 520. The pontoon mounts 516 are rods that fit inside the pontoon assembly tubes. The pontoon mounts 516 are coped and welded to the backrest frame assembly 502. The backrest frame 502 consists of several welded pipes left bar 508 and right bar 510 that are the same length and are cut at an angle at the top so that they can be welded to top bar 506. The back support bar 512 and bottom bar 514 are coped on both ends for welding. Spring loaded latch pins 522 are welded to the bottom bar 514 creating a seat adjustment function that allows the seat positioning to be controlled as previously mentioned and seen in FIG. 13. The backrest frame 502 is attached to the frame assembly 100 with left bracket 518 and right bracket 520 which are held in place by backrest bolts 124 and backrest nuts 126. As with the pontoon assembly 600, in the ideal embodiment, the backrest frame 502 will be the same material as the frame assembly 100. In alternative embodiments, the backrest can be any other corrosive resistant material that would not corrode overtime in close contact with the frame material in a chemical rich environment.

What is claimed is:

1. A human-powered land and amphibious vehicle wherein;
   the vehicle comprises a wheelchair wherein the wheelchair is configured for:
      human-powered operation on land through the rotation of a first side wheel and a second side wheel located on a first side and a second side of a seat that is configured for a human occupant;
      entering and exiting a swimming pool by rolling the wheelchair up and down a ramp of the swimming pool;
   the vehicle comprises a first water propulsion unit that harnesses the angular velocity of the first side wheel of the wheelchair through a bevel gear that is fixed to the first side wheel, wherein:
      the bevel gear converts the axis of rotation of the first side wheel to an axis of rotation of a first propeller; and
      the axis of rotation of the first propeller is perpendicular to the axis of rotation of the first side wheel;
   the vehicle comprises a second water propulsion unit that harnesses the angular velocity of the second side wheel of the wheelchair through a bevel gear that is fixed to the second side wheel, wherein:
      the bevel gear converts the axis of rotation of the second side wheel to an axis of rotation of a second propeller; and the axis of rotation of the second propeller is perpendicular to the axis of rotation of the second side wheel;
   the vehicle is configured for moving forward while in the water by simultaneously rotating the first side wheel and the second side wheel forward to create forward thrust from the first propeller and the second propeller;
   the vehicle is configured for moving backward while in the water by simultaneously rotating the first side wheel and the second side wheel backward to create backward thrust from the first propeller and the second propeller; and
   the vehicle is configured for rotating while in the water by simultaneously rotating the first side wheel and the second side wheel in opposite directions to create forward thrust from one propeller and backward thrust from the other propeller.

2. The human-powered land and amphibious vehicle of claim 1, wherein:
   the vehicle comprises closed-cell flotation;
   the closed-cell flotation is located:
      around and along a frame; and
      on pontoons located on the sides of the seat and in line with the center of gravity of the human-powered vehicle when occupied; and
   the frame comprises corrosion-resistant stainless steel.

3. The human-powered land and amphibious vehicle of claim 1, wherein:
   the vehicle comprises a seat adjustment feature configured to control of the position of the seat wherein the seat adjustment feature comprises two spring-loaded latch pins that engage with holes located on brackets on each side of the seat.

4. The human-powered land and amphibious vehicle of claim 1, wherein:
   the vehicle is configured for safely holding occupants weighing up to 250 pounds when the vehicle is in the swimming pool or on land.

5. The human-powered land and amphibious vehicle of claim 1, wherein:
   the vehicle comprises closed-cell flotation;
   the closed-cell flotation is located:
      around and along a frame; and
      on pontoons located to the sides of the seat and in line with the center of gravity of the vehicle when occupied;
   the frame comprises corrosion-resistant stainless steel;
   the vehicle comprises a seat adjustment feature configured to control of the position of the seat wherein the seat adjustment feature comprises two spring-loaded latch pins that engage with holes located on brackets on each side of the seat; and
   the vehicle is configured for safely holding occupants weighing up to 250 pounds when the vehicle is in the swimming pool or on land.

6. A human-powered vehicle for use on land and in water, wherein:
   the human-powered vehicle comprises:
      a chair;
      flotation means sufficient for the human-powered vehicle to float when it is in the water;
      a first wheel located on a first side of the chair, wherein the first wheel is configured to:
         be rotated by a human occupant of the chair when the human-powered vehicle is on land or in the water;
         be in contact with the ground when the human-powered vehicle is on land; and
         propel the human-powered vehicle in the water when the first wheel is rotated and the vehicle is in the water;
      a second wheel located on a second side of the chair, wherein the second wheel is configured to:
         be rotated by the human occupant when the human-powered vehicle is on land or in the water;
         be in contact with the ground when the human-powered vehicle is on land; and
         propel the human-powered vehicle in the water when the first wheel is rotated and the vehicle is in the water;
   propulsion of the human-powered vehicle in water comprises a first propeller;

the first propeller rotates about an axis of rotation that is perpendicular to the axis of rotation of the first wheel;

the first propeller is mechanically coupled to the first wheel by a bevel gear that converts rotation of the first wheel to rotation of the first propeller;

propulsion of the human-powered vehicle in water comprises a second propeller;

the second propeller rotates about an axis of rotation that is perpendicular to the axis of rotation of the first wheel the second propeller is mechanically coupled to the second wheel by a bevel gear that converts rotation of the second wheel to rotation of the second propeller.

7. The human-powered vehicle of claim 6 wherein:

the flotation of the human-powered vehicle comprises closed-cell foam along pontoons on both the first and second sides of a backrest;

the pontoon on the first side is not interchangeable with the pontoon on the second side;

the pontoons on the first side and the second side are able to be removed from the first side and the second side of the backrest;

the pontoons are able to be disassembled to allow for multiple modes of flotation;

the pontoons are configured for safely holding occupants weighing up to 250 pounds when in the water;

the flotation of the human-powered vehicle comprises closed-cell foam on both ends of a float bar;

the float bar is affixed to the front of the human-powered vehicle;

the float bar balances the extended leg embodiment of the human-powered vehicle.

8. A human-powered vehicle for use on land and in water, wherein:

the human-powered vehicle comprises a first gear train that converts the rotation of a first wheel of the human-powered vehicle into propulsive force in the water;

the first gear train comprises:
 a first main gear affixed to the first wheel;
 a first pinion gear responsive to the first main gear;
 a first shaft responsive to the first pinion gear;
 a first bevel gear responsive to the first shaft;
 a second bevel gear responsive to the first bevel gear;
 a second shaft responsive to the second bevel gear;
 a first propeller responsive to the second shaft; and
 the first shaft is perpendicular to the second shaft.

9. The human-powered vehicle for use on land and in water of claim 8, wherein:

the human-powered vehicle further comprises a second gear train that converts the rotation of a second wheel of the human-powered vehicle into propulsive force in the water;

the second gear train comprises:
 a second main gear affixed to the second wheel;
 a second pinion gear responsive to the second main gear;
 a third shaft responsive to the second pinion gear;
 a third bevel gear responsive to the third shaft;
 a fourth bevel gear responsive to the third bevel gear;
 a fourth shaft responsive to the fourth bevel gear;
 a second propeller responsive to the fourth shaft; and
 the third shaft is perpendicular to the fourth shaft.

10. The human-powered vehicle for use on land and in water of claim 8, wherein: the first gear train and the second gear train are not interchangeable.

11. The human-powered vehicle for use on land and in water of claim 8, wherein: the human-powered vehicle comprises closed-cell flotation.

12. The human-powered vehicle for use on land and in water of claim 8, wherein: the human-powered vehicle comprises a stainless-steel frame.

13. The human-powered vehicle for use on land and in water of claim 8, wherein the human-powered vehicle comprises a seat adjustment feature.

14. The human-powered vehicle for use on land and in water of claim 8, wherein the human-powered vehicle comprises pontoons.

\* \* \* \* \*